United States Patent
Benecke et al.

(10) Patent No.: US 6,548,127 B1
(45) Date of Patent: Apr. 15, 2003

(54) LIQUID-CRYSTALLINE PHOTOCROSSLINKABLE MIXTURE

(75) Inventors: Carsten Benecke, Weil am Rhein (DE); Richard Buchecker, Zürich (CH); Guy Marck, Schlierbach (FR)

(73) Assignee: Rolic AG, Zug (CH)

( * ) Notice: Subject to any disclaimer, the term of this patent is extended or adjusted under 35 U.S.C. 154(b) by 0 days.

(21) Appl. No.: 09/601,101

(22) PCT Filed: Jan. 26, 1999

(86) PCT No.: PCT/IB99/00136
§ 371 (c)(1),
(2), (4) Date: Jul. 27, 2000

(87) PCT Pub. No.: WO99/37735
PCT Pub. Date: Jul. 29, 1999

(30) Foreign Application Priority Data

Jan. 27, 1998 (CH) ............... 193/98

(51) Int. Cl.$^7$ ............... C09K 19/00
(52) U.S. Cl. ............... 428/1.2; 428/1.3; 349/124; 349/127
(58) Field of Search ............... 252/299.4, 299.01, 252/299.5, 299.6, 299.61, 299.63, 299.64, 299.67; 349/124–127; 428/1–1.62

(56) References Cited

U.S. PATENT DOCUMENTS

| | | | | |
|---|---|---|---|---|
| 5,332,521 A | * | 7/1994 | Yuasa et al. | 252/299.01 |
| 5,426,009 A | * | 6/1995 | Coates et al. | 252/299.61 |
| 5,518,652 A | * | 5/1996 | Parri et al. | 252/299.01 |
| 5,830,385 A | * | 11/1998 | Lau et al. | 252/299.01 |

FOREIGN PATENT DOCUMENTS

| | | | | |
|---|---|---|---|---|
| DE | 41 24 859 | | 1/1993 | |
| DE | 44 08 171 | | 9/1995 | |
| WO | WO 96/25470 | | 8/1996 | |
| WO | WO 97/34862 | | 9/1997 | |
| WO | 98/52905 | * | 11/1998 | C07C/69/62 |

* cited by examiner

Primary Examiner—Mark F. Huff
Assistant Examiner—Jennifer R. Sadula
(74) Attorney, Agent, or Firm—Finnegan, Henderson, Farabow, Garrett & Dunner, LLP

(57) ABSTRACT

Photocrosslinkable, mesogenic mixtures, especially for optical or electro-optical devices, exhibit improved properties when, in addition to containing two or more liquid-crystalline monomers each having at least two terminal polymerizable groups, they contain at least one non-liquid-crystalline monomer having no or, at most, one alicyclic or aromatic structural unit and having at least one terminal polymerizable group.

6 Claims, No Drawings

LIQUID-CRYSTALLINE PHOTOCROSSLINKABLE MIXTURE

This application is a national stage filing under 35 U.S.C. §371 of international application no. PCT/IB99/00136, filed on Jan. 26, 1999, which published in English.

The present invention relates to photocrosslinkable, mesogenic mixtures and to optical or electro-optical devices that have such mixtures in their crosslinked state.

Anisotropic thin films are used for an extremely wide variety of optical and electro-optical devices and components, such as, for example, optical retarders, cholesteric colour filters, polarising interference filters, dielectric mirrors, retarder films for enlarging the viewing angle of liquid crystal displays, optical security elements (copy proof devices), waveguide components (with or without $\chi_2$-coupling) and so on. A method of producing such anisotropic thin films that is elegant and efficient in practice consists of applying liquid-crystalline polymers or liquid-crystalline monomers to suitably prepared substrates by spin-coating. In the case of liquid-crystalline monomers, the monomers are subsequently crosslinked in the liquid-crystalline phase (LC phase). Such optical components, referred to below as LCP films, can then fulfil special tasks (LCP denotes liquid crystal polymer; films include single or multiple layers).

For the production of such LCP films, generally a certain number of mesogenic monomers is dissolved in a solvent suitable for the purpose, usually together with a (photo) initiator. The idea underlying such liquid crystal mixtures is to set certain physical properties, such as melting point, clear point, optical anisotropy, viscosity etc., to desired values. The combined effect of the liquid crystal components contained in the mixture, with their specific physical properties, results in the liquid crystal mixture's having properties that cannot be achieved by individual liquid crystal components. An example of this is the eutectic, that is to say the finding of the lowest melting point in dependence upon the concentration of individual liquid crystal components. A liquid crystal mixture can generally be satisfactorily optimised to one or more desired physical properties.

After filtration, the solution can then be applied by spin-coating or other coating technique to a cleaned substrate plate (glass, silicon wafer, metal) provided with an orientation layer. For the orientation layer predominantly known methods are used, such as LPP (linear photopolymerisation, i.e. photo-oriented polymer network), rubbed polyimide, or SiOx vapour-deposited at an angle. The LCP film so produced is then dried (removal of the solvent) and crosslinked, for example by means of a UV lamp. Such LCP films are distinguished by an optical anisotropy, for which the optical axis is determined by the underlying orientation layer or by an applied electric field. The orientation can also be structured spatially by using an LPP orientation layer.

A disadvantage of the method is that after crosslinking the formation of so-called tilt domains is often observed. Tilt domains are adjoining LCP regions that have opposite angles of tilt while having the same orientation of the optical axis. Such tilt domains are frequently a source of defects and losses of efficiency. For example, in waveguides they increase the scattering losses and in optical filters the contrast, that is to say the dark state, is adversely affected. Especially when an LCP retarder layer is to serve simultaneously as the orientation layer of a liquid crystal cell, in which angles of tilt that are precisely defined in terms of magnitude and direction must generally be present, tilt domains cannot be tolerated.

Surprisingly, it has now been found that in the described production of LCP layers the formation of tilt domains does not occur when the mixture of liquid-crystalline monomers brought to photopolymerisation additionally contains at least one further compound that, on the one hand, is photopolymerisable but, on the other hand, is non-liquid-crystalline (i.e. non-mesogenic or isotropic). LCP films produced from such mixtures are distinguished especially by particularly high contrast and by uniform spatial (lateral) angle dependency, without the thermal or photochemical stability being impaired to any appreciable extent.

In principle, the addition of isotropic compounds in liquid-crystalline mixtures is undesirable; because as the amount increases, the mesophase region of the mixtures is significantly reduced as a result. In practice, however, isotropic additives in the form of optically active compounds are used when it is desired to achieve chiral liquid-crystalline phases, such as cholesteric or chiral smectic phases, and suitable optically active additives that -are themselves liquid-crystalline are not available. The use of isotropic monomers for the suppression of tilt domains in liquid-crystalline polymer networks was unknown hitherto, however.

In order to reduce mesophase depressions, the mentioned, already known isotropic optically active dopants have chemical structures that are as close as possible to those of liquid crystals, that is to say they contain generally at least two, mostly six-membered, rings. In contrast, the isotropic compounds present in the mixtures according to the invention are especially effective in the suppression of tilt domains when, in terms of chemical structure, they are as different as possible from the general structural principle of liquid-crystalline compounds, that is to say they have at most one ring, which need not necessarily be six-membered, or preferably have no ring at all. In addition, these isotropic additives need not necessarily be optically active. Generally, therefore, achiral or chiral racemic compounds are preferred; in principle, however, isotropic optically active compounds having at most one ring can also be used.

The present invention accordingly relates to liquid-crystalline mixtures crosslinkable by photopolymerisation that contain at least two liquid-crystalline monomers each having at least two terminal polymersable groups and additionally at least one non-liquid-crystalline monomer having no or, at most, one alicyclic or aromatic structural unit and having at least one terminal polymerisable group, and to optical or electro-optical devices that have such a mixture in its crosslinked state, and to the use of such a mixture in its crosslinked state for an optical or electro-optical device.

A minimum of two terminal polymerisable groups on each of the liquid-crystalline monomers (and thus the possibility of fixing the molecules at at least two points) is a prerequisite for the formation of a crosslinked product in which the liquid-crystalline monomers later retain the orientation set during the crosslinking process with sufficient stability. The non-liquid-crystalline monomer need not be specially oriented, however, so that in this instance a single terminal polymerisable group can suffice.

In principle, the effect of suppressing tilt domains brought about by the invention can be achieved also by the admixture of non-polymerisable isotropic additives. In that case, however, there is a risk of later diffusion or dissolving out through any overlying liquid-crystalline substances, which is prevented by the presence of at least one polymerisable group.

Previous experience has shown that, as a rule, the non-liquid-crystalline monomers having no or, at most, one alicyclic or aromatic structural unit must be present in a proportion of at least one percent by weight in order to achieve the desired positive effect. Especially good results are frequently obtained only from a proportion of at least five percent by weight.

On the other hand, the presence of an isotropic monomer as a component in a liquid-crystalline mixture has the effect that, as its concentration increases, the liquid-crystalline phase region is increasingly reduced, so that its content has an upper limit and generally may not be more than 50%.

It will be understood that it is also possible for two or more different non-liquid-crystalline monomeric compounds each having at least one terminal polymerisable group to be present.

There especially come into consideration liquid-crystalline mixtures in which the at least two liquid-crystalline monomers each correspond to a compound of the general formula I $$(P^1\text{—}S^1)_n\text{—}M\text{—}(S^2\text{—}P^2)_m \qquad (I)$$

wherein
M represents a mesogenic radical that contains at least two six-membered rings,
$S^1$, $S^2$ represent identical or different spacer groups,
$P^1$, $P^2$ represent polymerisable groups,
m, n independently of one another represent 1 or 2,
and the at least one non-liquid-crystalline monomer corresponds to a compound of the general formula II $$(P^3)_{n'}\text{—}Q\text{—}(P^4)_{m'} \qquad (II)$$

wherein
Q represents an organic radical having from 2 to 40 carbon atoms that contains at most one alicyclic or aromatic ring,
$P^3$, $P^4$ represent polymerisable groups, and
m', n' independently of one another represent from 0 to 2, with the proviso that m'+n'≧1.

Special preference is given to liquid-crystalline mixtures in which the at least two liquid-crystalline monomers each correspond to a compound of the general formula III:

$$P^5\text{—}S^3\text{—}[C^1\text{—}Z^1]_o\text{—}[C^2\text{—}Z^2]_p\text{—}[C^3\text{—}Z^3]_q\text{—}C^4\text{—}Z^4\text{—}C^5\text{—}Z^5\text{—}S^4\text{—}P^6 \qquad (III)$$

wherein
$C^1$, $C^2$, $C^3$, $C^4$, $C^5$ independently of one another represent 1,4-phenylene, unsubstituted or optionally substituted by fluorine, chlorine, cyano, nitro or an alkyl or alkenyl radical having up to 24 carbon atoms, wherein one or more non-adjacent $CH_2$ groups may have been replaced by a radical selected from the group —O—, —S—, —CO—, —O—CO—, —CO—O— and —C≡C— and wherein one or more hydrogen atoms may optionally have been replaced by fluorine, chlorine, cyano; pyridine-2,5-diyl, pyridine-2,5-diyl, cyclohexane-1,4-diyl, 1,3-dioxane-2,5-diyl, piperidine-1,4-diyl, piperazine-1,4-diyl, thiophenylene, naphthylene, [1,3,4]thiadiazoles or [1,3,4]oxadiazoles;
$Z^1$, $Z^2$, $Z^3$, $Z^4$, $Z^5$ independently of one another represent a single covalent bond, —$(CH_2)_t$—, —O—, —CO—, —CO—O—, —O—OC—, —$NR^1$—, —CO—$NR^1$—, —$R^1N$—CO—, —$(CH_2)_u$—O—, —O—$(CH_2)_u$—, —$(CH_2)_u$—$NR^1$— or —$NR^1$—$(CH_2)_u$—, wherein $R^1$ represents hydrogen or a lower alkyl, t is an integer from 1 to 4 and u is an integer from 1 to 3;

$S^3$ represents a single covalent bond or a spacer unit, such as a straight-chain alkylene grouping —$(CH_2)_r$— optionally mono- or poly-substituted by fluorine, chlorine, lower alkyl or cyano, or a chain of the formula —$(CH_2)_r$—$L^1$—$(CH_2)_s$—$L^2$—, wherein $L^1$ and $L^2$ each independently of the other may be a single bond or linking functional groups such as —O—, —COO—, —OOC—, —$NR^2$—, —$NR^2$—CO—, —CO—$NR^2$—, —$NR^2$—COO—, —OCO—$NR^2$—, —$NR^2$—CO—$NR^2$—, —CH=CH—, —C≡C—, —O—COO—, wherein $R^2$ represents hydrogen or lower alkyl and r and s are each an integer from 1 to 20, with the proviso that r+s≦24;

$S^4$ represents a single covalent bond or a spacer unit, such as a straight-chain alkylene grouping —$(CH_2)_r$— optionally mono- or poly-substituted by fluorine, chlorine, lower alkyl or cyano, or a chain of the formula —$L^1$—$(CH_2)_r$—$L^2$—$(CH_2)_s$—, wherein $L^1$ and $L^2$ each independently of the other may be a single bond or linking functional groups such as —O—, —COO—, —OOC—, —$NR^2$—, —$NR^2$—CO—, —CO—$NR^2$—, —$NR^2$—COO—, —OCO—$NR^2$—, —$NR^2$—CO—$NR^2$—, —CH=CH—, —C≡C—, —O—COO—, wherein $R^2$ represents hydrogen or lower alkyl and r and s are each an integer from 1 to 20, with the proviso that r+s≦24;

o, p, q are 0 or 1;
$P^5$, $P^6$ independently of one another represent a crosslinkable group such as acrylate, methacrylate, 2-chloroacrylate, 2-phenylacrylate, acryloylphenylene, acrylamide, methacrylamide, 2-phenylacrylamide, epoxy, itaconic acid esters, vinyloxy, vinyloxycarbonyl, styrene derivatives, maleic acid derivatives, fumaric acid derivatives or a cinnamic acid derivative optionally substituted by methyl, methoxy, cyano and/or halogen.

In the context of the present invention the expression "lower alkyl" includes a straight-chain or branched alkyl group having from 1 to 6 carbon atoms, such as, for example, methyl, ethyl, propyl, butyl, isobutyl, tert.-butyl, pentyl, hexyl, but especially methyl, ethyl, propyl or butyl.

Also especially preferred are liquid-crystalline mixtures in which the at least one non-liquid-crystalline monomer corresponds to a compound of the general formula IV $$P^7\text{—}(F^1)_{r'}\text{—}(\text{—}D\text{—})_{o'}\text{—}(F^2)_{p'}\text{—}(\text{—}P^8)_{q'} \qquad (IV)$$

wherein
D represents cyclopropanediyl, cyclobutanediyl, cyclopentanediyl, cyclohexanediyl, 1,3-dioxane-2,5-diyl; phenylene that is unsubstituted or optionally substituted by fluorine, chlorine, cyano, nitro or an alkyl or alkenyl radical having up to 24 carbon atoms, wherein one or more non-adjacent $CH_2$ groups may have been replaced by a radical selected from the group —O—, —S—, —CO—, —O—CO—, —CO—O— and —C≡C— and wherein one or more hydrogen atoms may optionally have been replaced by fluorine, chlorine, cyano; pyridine-2,5-diyl, pyridine-2,5-diyl, piperidine-1,4-diyl, piperazine-1,4-diyl, thiophenylene, [1,3,4]thiadiazoles or [1,3,4]oxadiazoles;
$F^1$, $F^2$ represent a straight-chain alkylene grouping optionally mono- or poly-substituted by fluorine, chlorine, lower alkyl or cyano, in which one or more non-adjacent $CH_2$ groups may have been replaced by linking atoms or groups such as —O—, —COO—, —OOC—, —$NR^3$—, —$NR^3$—CO—, —CO—$NR^3$—, —NR³—COO—, —OCO—NR³—, —NR³—CO—NR³—, —CH=CH—, —C≡C—, —O—COO—, or by a chain of the formula —Si(CH₃)₂—O—[Si(CH₃)₂—O—]_{w'}—Si(CH₃)₂—, wherein R³ represents hydrogen or lower alkyl and w' is an integer from 0 to 2, with the proviso that the total number of carbon atoms and of any hetero atoms substituting them in F¹ and F² together does not exceed the number 40;

P⁷, P⁸ independently of one another represent a crosslinkable group such as acrylate, methacrylate, 2-chloroacrylate, 2-phenylacrylate, acryloylphenylene, acrylamide, methacrylamide, 2-phenylacrylamide, epoxy, itaconic acid esters, vinyloxy, vinyloxycarbonyl, styrene derivatives, maleic acid derivatives, fumaric acid derivatives or a cinnamic acid derivative optionally substituted by methyl, methoxy, cyano and/or halogen;

q' is 0 or 1 and l', o', p' are 0 or 1, with the proviso that l'+o'+p'≧1.

The invention is illustrated further by the following Example.

EXAMPLE: MIXTURE FOR AN LCP FILM

In this Example the following components were used as crosslinkable monomers:
Mon1:
2,5-bis-[4-(6-acryloyloxyhexyloxy)benzoyloxy]benzoic acid pentyl ester
Mon2:
4-(6-acryloyloxyhexyloxy)benzoic acid 4-[trans-4-[4-(6-acryloyloxyhexyloxy)benzoyloxy]cyclohexyl]phenyl ester
Mon3:
1,4-diacryloyl-butane
Mon1 and Mon2 are liquid-crystalline, but Mon3 is not.

A mixture of 70% by weight Mon1, 20% by weight Mon2 and 10% by weight Mon3 was prepared. 2% by weight of the photoinitiator IRGACURE 369 from Ciba-Geigy and 2% by weight of 2,6-di-tert.-butyl-p-cresol were added, dissolved in anisole (20% by weight) and then applied to a glass plate by spin-coating at 1000 revolutions per minute. The glass plate had beforehand been coated with 4-[4-[6-(2-methacryloyloxy)hexyloxy]benzoyloxy]-3-methoxycinnamic acid methyl ester and irradiated with linearly polarised light to produce an LPP orientation layer. The new layer was then irradiated with xenon light in vacuo at room temperature in a vacuum cabinet. The LCP layer so produced has a tilt-domain-free, crosslinked nematic structure. The layer can be used as a retarder layer.

Instead of Mon3 it is also possible to use especially the following as non-liquid-crystalline component:
1,4-divinyloxy-butane
1,6-divinyloxy-hexane
1,6-diacryloyloxy-hexane
1,4-di(2-methylacryloyloxy)butane
1,6-di(2-methylacryloyloxy)hexane
1,6-di(2-methylacryloyloxy)-2,2,3,3,4,4,5,5-octafluorohexane
1,4-bis(acryloyl)piperazine
1,8-diacryloyloxy-octane
1,8-di(2-methylacryloyloxy)octane
2,9-diacryloyloxy-decane
acrylic acid pentyl ester
methacrylic acid pentyl ester
acrylic acid hexyl ester
acrylic acid decyl ester
1,4-trans-di(acryloyloxymethyl)cyclohexane
1,4-trans-di[(6-acryloyloxyhexyloxy)methyl]cyclohexane Numerous examples of liquid-crystalline components having at least two polymerisable terminal groups have been described in the literature, for example in Adv. Mater. 5, 107 (1993), Mol. Cryst Liq. Cryst. 307, 111 (1997), J. Mat. Chem. 5, 2047 (1995) or in patent specifications U.S. Pat. Nos. 5,593,617 and 5,567,349.

What is claimed is:

1. A method for reducing the formation of tilt domains in a liquid crystal polymer film, wherein the method comprises:

forming a mixture of at least two non-crosslinked liquid-crystalline monomers, each having at least two terminal polymerizable groups;

adding at least one non-liquid-crystalline monomer to the mixture; and, crosslinking the combined mixture of the liquid-crystalline and non-liquid-crystalline monomers to make the film.

2. A method according to claim 1, wherein the non-liquid-crystalline monomer has at most one alicyclic or aromatic structural unit.

3. A method according to claim 2, wherein the non-liquid-crystalline monomer has at least one terminal polymerisable group.

4. A method according to claim 1, wherein the non-liquid-crystalline monomer is a compound of the general formula IV

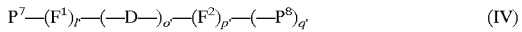

wherein

D represents cyclopropanediyl, cyclobutanediyl, cyclopentanediyl, cyclohexanediyl, 1,3-dioxane-2,5-diyl; phenylene that is unsubstituted or optionally substituted by fluorine, chlorine, cyano, nitro or an alkyl or alkenyl radical having up to 24 carbon atoms, wherein one or more non-adjacent CH₂ groups are optionally replaced by a radical selected from the group —O—, —S—, —CO—, —O—CO—, —CO—O— and —C≡C— and wherein one or more hydrogen atoms are optionally replaced by fluorine, chlorine, or cyano; or D represents pyridine-2,5-diyl, pyrimidine-2,5-diyl, piperidine-1,4-diyl, piperazine-1,4-diyl, thiophenylene, a [1,3,4]thiadiazole, or a [1,3,4]oxadiazole;

F¹, F² represent a straight-chain alkylene grouping optionally mono- or poly-substituted by fluorine, chlorine, lower alkyl or cyano, in which one or more non-adjacent CH₂ groups are optionally replaced by linking atoms or groups or by a chain of the formula —Si(CH₃)₂—O—[Si(CH₃)₂—O—]_{w'}—Si(CH₃)₂—,
wherein w' is an integer from 0 to 2, with the proviso that the total number of carbon atoms and of any hetero atoms substituting them in F¹ and F² together does not exceed the number 40;

P⁷, P⁸ independently of one another represent a crosslinkable group;

q' is 0 or 1 and l', o', p' are 0 or 1, with the proviso that l'+o'+p'≧1.

5. A method according to claim 4, wherein F¹ and F² represent a straight-chain alkylene grouping optionally mono- or poly-substituted by fluorine, chlorine, lower alkyl or cyano, in which one or more non-adjacent CH₂ groups are replaced by one or more of —O—, —COO—, —OOC—, —NR³—, —NR³—CO—, —CO—NR³—, —NR³—COO—, —OCO—NR³—, —NR³—CO—NR³—, —CH=CH—, —C≡C—, and —O—COO—, wherein R³ represents hydrogen or lower alkyl.

6. A method according to claim 4, wherein $P^7$ and $P^8$ independently of one another represent acrylate, methacrylate, 2-chloroacrylate, 2-phenylacrylate, acryloylphenylene, acrylamide, methacrylamide, 2-phenylacrylamide, epoxy, an itaconic acid ester, vinyloxy, vinyloxycarbonyl, a styrene derivative, a maleic acid derivative, a fumaric acid derivative or a cinnamic acid derivative optionally substituted by methyl, methoxy, cyano and/or halogen.

* * * * *